(12) United States Patent
Noui (10) Patent No.: US 8,493,662 B2
(45) Date of Patent: Jul. 23, 2013

(54) WAVEGUIDES (75) Inventor: Louahab Noui, Rochester (GB)

(73) Assignee: BAE SYSTEMS plc (GB)

( * ) Notice: Subject to any disclaimer, the term of this patent is extended or adjusted under 35 U.S.C. 154(b) by 162 days.

(21) Appl. No.: 13/119,390

(22) PCT Filed: Sep. 7, 2009

(86) PCT No.: PCT/GB2009/051128
§ 371 (c)(1),
(2), (4) Date: Mar. 16, 2001

(87) PCT Pub. No.: WO2010/032029
PCT Pub. Date: Mar. 25, 2010

(65) Prior Publication Data
US 2011/0176218 A1   Jul. 21, 2011

(30) Foreign Application Priority Data

Sep. 16, 2008  (GB) .................................. 0816938.5
Sep. 16, 2008  (GB) .................................. 08275053.0

(51) Int. Cl.
G02B 27/14  (2006.01)
G02B 5/32   (2006.01)
G02F 1/1335 (2006.01)

(52) U.S. Cl.
USPC .............................. 359/633; 359/15; 349/11

(58) Field of Classification Search
USPC .................. 359/633, 567, 15, 19, 32, 33, 34, 359/9, 618, 629, 630; 349/5–8, 11, 15; 385/37, 385/129
See application file for complete search history.

(56) References Cited

U.S. PATENT DOCUMENTS 6,580,529 B1 *  6/2003  Amitai et al. .................... 359/13
2007/0188837 A1  8/2007  Shimizu et al.

FOREIGN PATENT DOCUMENTS

| EP | 1734401 A1 | 12/2006 |
| JP | 10160938 A | 6/1998 |
| JP | 2001332112 A | 11/2001 |
| WO | 99/52002 A1 | 10/1999 |

(Continued)

OTHER PUBLICATIONS

International Preliminary Report on patentability in related application PCT/GB2009/051128 mailed Dec. 22, 2010.

(Continued)

*Primary Examiner* — Dawayne A Pinkney
(74) *Attorney, Agent, or Firm* — Pillsbury Winthrop Shaw Pittman LLP (57) ABSTRACT

A waveguide 60 formed of material 62 allows propagation of image bearing light along a light pathway 64 by total internal reflection of the image bearing light. The layer of material 62 is a light transparent material arranged to allow an observer, not illustrated, to look through the layer of material 62 whilst also arranged to carry image bearing light. A grating element 66 carried within the layer of material 62 is arranged such that impinging image bearing light following the light pathway 64 is either diffracted out of the layer of material 62 as a pupil of image bearing light 68$a$ to 68$n$ or is reflected by either surface 70 or surface 72. The efficiency of the grating element 66 is varied along the length of the layer of material 62 to achieve the desired pupils of image bearing light 68$a$ to 68$n$ along the length of the layer of material 62. This results in a more even brightness of pupils of image bearing light 68$a$ to 68$n$, as perceived by the observer looking through the layer of material 62.

18 Claims, 4 Drawing Sheets

FOREIGN PATENT DOCUMENTS

| | | |
|---|---|---|
| WO | 2007/029032 | 3/2007 |
| WO | 2007/029032 A1 | 3/2007 |
| WO | 2007/129783 A | 11/2007 |

OTHER PUBLICATIONS

International Search Report in related application PCT/GB2009/051128 mailed Jan. 21, 2010.

British Search Report in related application 0816938.5 dated Dec. 10, 2008.

European Search Report in related application 08 27 5053 mailed Mar. 10, 2009.

* cited by examiner

WAVEGUIDES

CROSS REFERENCE TO RELATED APPLICATIONS

This is the U.S. National Phase of PCT/GB2009/051128, filed Sep. 7, 2009, which claims priority to British Patent Application No. 0816938.5, filed Sep. 16, 2008 and European Patent Application No. 08275053.0 filed Sep. 16, 2008 each of which are incorporated by reference herein in their entireties.

This invention relates to a waveguide and a projection display for displaying an image to an observer, which is particularly, but not exclusively, suitable for use in a head up display, a helmet mounted display or head mounted display.

Figure 1:
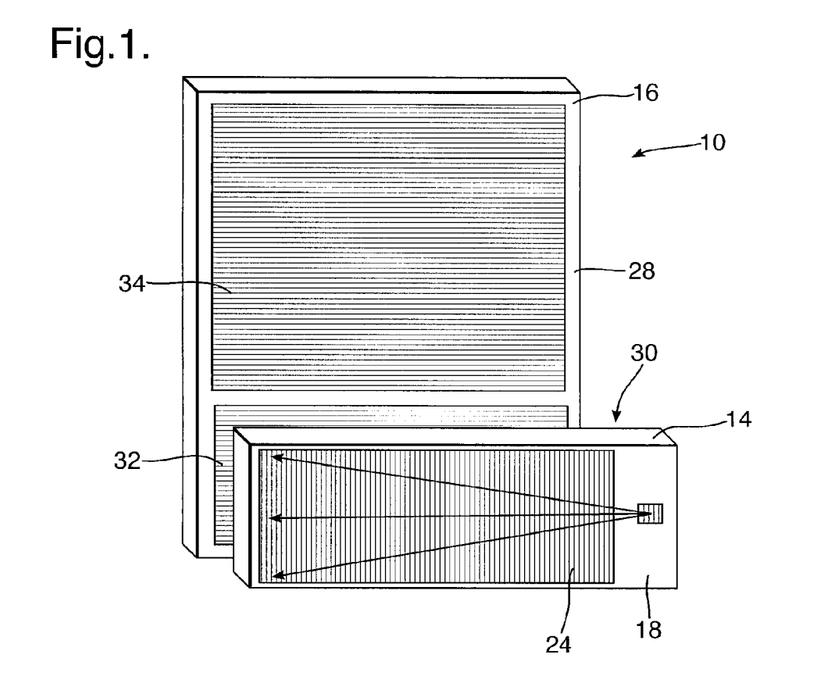
FIG. 1 illustrates, in perspective view, a prior art projection display including parallel waveguides.
Figure 2:
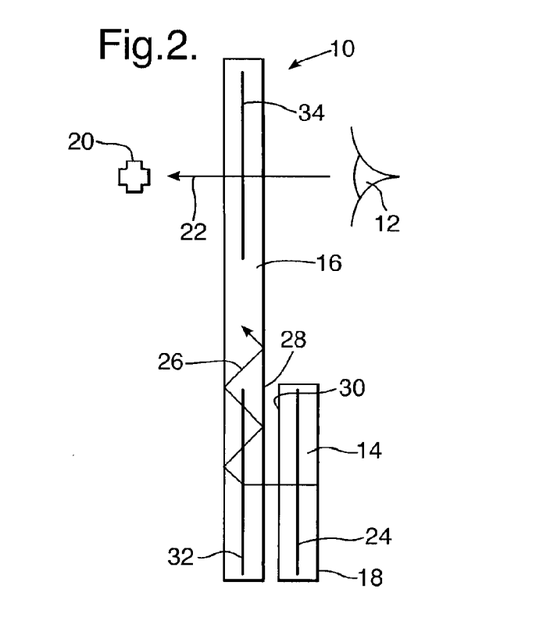
FIG. 2 illustrates, in elevation view, the prior art projection display of FIG. 1.

Referring to FIGS. 1 and 2, wherein like references have been used to indicate similar integers, prior art International patent application publication number WO2007/029032 teaches a projection display 10 for displaying an image to an observer 12 that uses waveguide techniques to generate a collimated display defining a large exit pupil at the point of the observer 12 and a large field of view, whilst using a small image-providing light source device. The projection display 10 uses a first plate-like waveguide 14 made of light transmissive material such as glass or plastic and a second plate-like waveguide 16 made from a light transmissive and light transparent material such as glass or plastic. The projection display 10 additionally includes an image-providing light source device, not shown, located to inject image bearing light into the first plate-like waveguide 14 through a first face 18.

The image-providing light source device includes a micro-display arranged to provide information to be displayed to the observer 12. Additionally the image-providing light source device includes a collimating optical arrangement located between the micro-display and the first face 18 of the first plate-like waveguide 14. The collimating optical arrangement is operable to collimate light received from the micro-display and to inject the collimated image bearing light into the first plate-like waveguide 14 through the first face 18.

The collimated image bearing light produced by the collimating optical arrangement has a small exit pupil and is fed into the first plate-like waveguide 14, which performs the function of stretching the horizontal pupil of the final display. The output from the first plate-like waveguide 14 is fed into the second plate-like waveguide 16, which is arranged to stretch the vertical pupil of the final display and also to act as a combiner for the projection display 10 through which the observer 12 views an outside world scene 20 along a line of sight 22 of the observer 12 through the second plate-like waveguide 16 with information to be displayed to the observer 12 overlaid on the outside world scene 20. In this manner, the image to be displayed to the observer 12 looking through the second plate-like waveguide 16 defines a large exit pupil and a large field of view whilst using a small image generating light source.

Image bearing light injected into first plate-like waveguide 14, via first face 18 is incident on a transmission grating 24 arranged internally within the first plate-like waveguide 14 and substantially parallel with the first face 18. Light impinging on the transmission grating 24 diffracts therefrom such that the incidence angle of the light on the internal surfaces of the first plate-like waveguide 14 is greater than the critical angle for the material from which the first plate-like waveguide 14 is made. The image bearing light is constrained within the first plate-like waveguide 14 to propagate along the first plate-like waveguide 14 reflecting from each internal surface in turn to follow a predefined light path 26. Thus, the relative field angles of the light incident on the first plate-like waveguide 14 at the first face 18 are preserved within the first plate-like waveguide 14 and the information required to regenerate the original image is preserved.

The transmission grating 24 also serves to radiate the image bearing light out of the first plate-like waveguide 14. The transmission grating 24 is a low efficiency grating which diffracts a small amount of light out of the first plate-like waveguide 14 on each interaction with incident image bearing light.

The second plate-like waveguide 16 is located with a first face 28 parallel with a second face 30 of the first plate-like waveguide 14 and is arranged to receive the image bearing light exiting the second face 30 of the first plate-like waveguide 14. The second face 30 is parallel to the first face 18 of the first plate-like waveguide 14. The first face 28 of the second plate-like waveguide 16 is located adjacent and close to the second face 30 of the first plate-like waveguide 14. The second plate-like waveguide 16 includes a coupling grating 32 located therein arranged substantially parallel to the first face 28 of the second plate-like waveguide 16 and the coupling grating 32 is operable to diffract each impinging ray of image bearing light received from the transmission grating 24 of the first plate-like waveguide 14 at an angle that is larger than the critical angle for the material from which the second plate-like waveguide 16 is made. Accordingly, received image bearing light will propagate inside the second plate-like waveguide 16 to follow the predefined light path 26. The image bearing light continues along the light path 26 to an exit grating 34 arranged on or within the second plate-like waveguide 16, which is arranged to diffract the received image bearing light out of the second plate-like waveguide 16 towards the observer 12.

The coupling grating 32 is arranged such that its diffractive power is rotated through 90 degrees to that of the diffractive power of the parallel transmission grating 24 to rotate incident image bearing light towards the exit grating 34.

The exit grating 34 is a low efficiency grating, such that as image bearing light propagates along the light path 26 within the second plate-like waveguide 16, each interaction with the exit grating 34 causes a small proportion of the image bearing light to be diffracted out of the second plate-like waveguide 16. Image bearing light which is not diffracted out of the second plate-like waveguide 16 continues to propagate within the second plate-like waveguide 16. Accordingly, a large number of parallel rays of image bearing light exit the second plate-like waveguide 16 through the exit grating 34 towards the observer 12, which originated at discrete points on the micro-display forming the image generating light source device.

Figure 3:
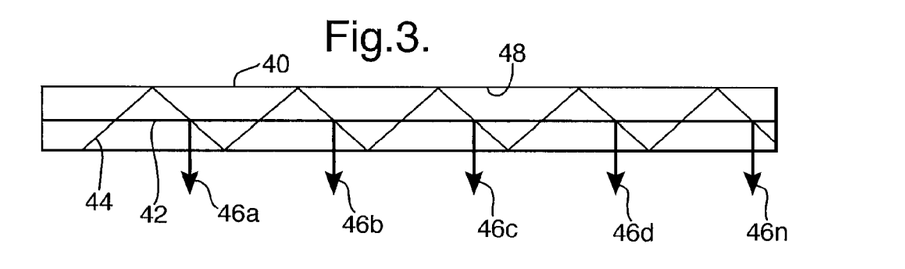
FIG. 3 illustrates, in elevation view, a prior waveguide.

Referring to FIG. 3, there is shown in more detail a second plate-like waveguide 40 that includes an exit grating 42 arranged such that impinging image bearing light following a light pathway 44 is either diffracted out of the second plate-like waveguide 40 as a pupil of image bearing light 46a to 46n for viewing by an observer, not illustrated, or image bearing light passes through the exit grating 42 and is reflected by internal surface 48 of the second plate-like waveguide 40 so as to propagate further through the second plate-like waveguide 40 towards a distal end and hence impinge on the exit grating 42 again. It will be noted that the individual pupils of image bearing light 46a to 46n exiting the second plate-like waveguide 40 as illustrated are the centres of the output pupils and are regularly spaced.

In such a prior art projection display 10, the brightness of the display, as perceived by the observer 12 looking through the second plate-like waveguide 16, will vary with distance along the light path 26. The intensity of the individual pupils of image bearing light exiting the second plate-like waveguide 40 is indicated by the thickness of the lines used to show image bearing light 46a to 46n, which illustrates that the intensity decreases with distance along the light pathway 44. This results in less intensity of image bearing light towards the distal end of the second plate-like waveguide 40 such that an observer will perceive pupil of image bearing light 46a to be less intense than pupil of image bearing light 46n.

Figure 4:
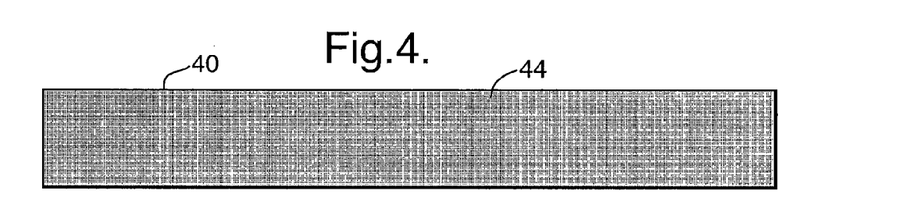
FIG. 4 illustrates, in plan view, a prior art grating structure.

Referring to FIG. 4, wherein like references have been used to indicate similar integers to those described with reference to FIG. 3, there is shown a prior art exit grating 42, which is rectangular in shape and is arranged such that it extends across the width and length of the second plate-like waveguide 40. That is, the exit grating 42 has a regular grating profile which extends across the entire area of the second plate-like waveguide 40.

It will be understood that the same problem of irregular intensity of image bearing light applies to the transmission grating 24 of the first plate-like waveguide 14.

According to a first aspect of the invention a waveguide, includes a layer of material arranged to allow propagation of image bearing light along a predefined propagation axis of the layer of material by total internal reflection of the image bearing light within the layer of material, a grating element carried on or within the layer of material that is arranged upon interaction with incident image bearing light to allow at least some incident image bearing light to exit the layer of material or to direct at least some of the incident image bearing light within the layer of material and wherein the grating element is arranged such that incident image bearing light that exits the layer of material is proportional to the efficiency of the grating element the image bearing light is incident upon and the efficiency varies with distance along the propagation axis of the layer of material.

In this manner, the luminance of pupils of image bearing light that exit the waveguide can be varied with distance along the propagation axis of the layer of material.

The grating element may be arranged such that the luminance of image bearing light that exits the layer of material is substantially uniform with distance along the propagation axis of the layer of material. In this manner, the luminance of pupils of image bearing light that exit the waveguide can be made more uniform such that an observer will perceive a more even brightness when viewing the waveguide.

The efficiency of the grating element may be proportional to the area of the grating element that image bearing light is incident upon.

The grating element may be arranged such that there is increased interaction between the grating element and incident image bearing light with distance along the propagation axis of the layer of material.

A beam splitter may also be carried on or within the layer of material and the beam splitter may be arranged to split incident image bearing light and to direct such image bearing light within the layer of material.

According to another aspect of the invention a projection display, for displaying an image to an observer, includes a first waveguide element arranged to be light transmissive, an image-providing light source device arranged to generate an image and to inject image bearing light into the first waveguide element to follow a propagation axis, a first grating associated with the first waveguide element arranged to direct the image bearing light internally along the propagation axis and through which the image bearing light is outputted from the first waveguide element, a second waveguide element arranged to be light transmissive and transparent that includes a coupling grating arranged to receive the image bearing light from the first waveguide element and to direct the image bearing light along the second waveguide element to follow a propagation axis, the second waveguide element further includes an exit grating arranged to diffract received image bearing light out of the second waveguide element towards an observer, wherein the first and/or the exit grating is arranged upon interaction with incident image bearing light to allow at least some incident image bearing light to exit its associated waveguide element or to direct at least some of the incident image bearing light within its associated waveguide element and wherein the first and/or the exit grating is arranged such that incident image bearing light that exits it associated waveguide element is proportional to the efficiency of the first and/or exit grating the image bearing light is incident upon and the efficiency varies with distance along the propagation axis associated with the waveguide element.

In this manner, the luminance of pupils of image bearing light that exit the first waveguide element and/or second waveguide element can be varied with distance along the propagation axis of the first waveguide element and/or second waveguide element.

The first and/or exit grating may be arranged such that the luminance of image bearing light that exits its associated waveguide element is substantially uniform with distance along the propagation axis of its associated waveguide element. In this manner, the luminance of pupils of image bearing light that exit the first waveguide element and/or the second waveguide element can be made more uniform such that an observer will perceive a more even brightness when viewing the second waveguide element.

The efficiency of the first and/or exit grating may be proportional to the area of the first and/or exit grating that image bearing light is incident upon.

A collimating lens arrangement may be arranged between the image-providing light source device and the first waveguide element and the collimating lens arrangement may be arranged to collimate image bearing light generated by the image-providing light source.

The first grating may be arranged such that incident inputted image bearing light is diffracted therefrom with the incidence angle of the diffracted light at internal surfaces of the first waveguide element arranged to be greater that the critical angle for the material from which the first waveguide element is made.

The first grating may be a low efficiency grating. The first grating may be a transmission type or reflective type grating.

The coupling grating may be arranged such that incident image bearing light is diffracted therefrom with the incident angle of the diffracted light at internal surfaces of the second waveguide element arranged to be greater than the critical angle for the material from which the second waveguide element is made.

The diffractive power of the coupling grating may be rotated through 90° with respect to the diffractive power of the first grating.

The second waveguide element may include a narrow band selective reflection coating provided on a surface of the second waveguide element parallely spaced from the exit grating, which reflective coating is arranged to reflect light passing through the exit grating back towards the narrow band selective reflection coating to the exit grating.

The first waveguide element and/or the second waveguide element may be curved.

The injection of image bearing light may be via reflective or transmissive or refractive means.

The first waveguide element may be plate-like, the second waveguide element may be plate-like and the first and second waveguide elements may be arranged substantially parallel to one another.

The first grating, coupling grating and exit grating may be arranged substantially in the same plane.

The first waveguide element and the second waveguide element may be formed within a single piece of material.

The first waveguide element may be rod-like, the second waveguide element may be plate-like and the first and second waveguide elements may be arranged such the image bearing light exits the first waveguide element along a longitudinal axis of the first waveguide element and enters the second waveguide element to propagate along the propagation axis of the second waveguide element.

The waveguide of the projection display of the invention may form part of A Head Up Display, or Helmet Mounted Display, or Head Mounted Display.

The invention will now be described, by way of example only, with reference to the accompanying drawings, in which.

Figure 5:
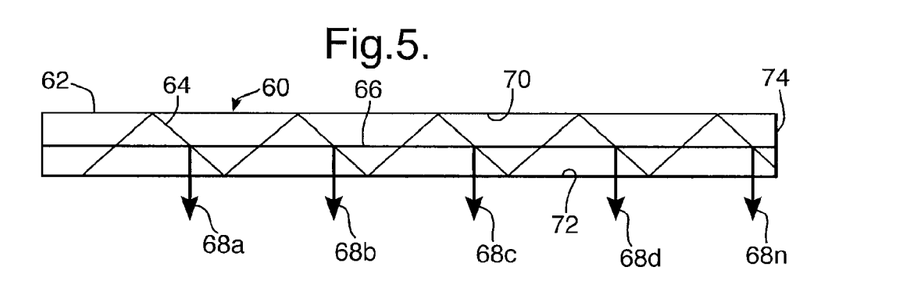
FIG. 5 illustrates, in elevation view, a waveguide according to the present invention.

Referring to FIG. 5, there is shown a waveguide 60 including a layer of material 62 arranged to allow propagation of image bearing light along a propagation axis to follow a light pathway 64 within the layer of material 62 by total internal reflection of the image bearing light. The layer of material is a light transparent material arranged to allow an observer, not illustrated, to look through the layer of material 62 whilst also arranged to carry image bearing light.

A grating element 66 carried within the layer of material 62 is arranged such that impinging image bearing light following the light pathway 64 is either diffracted out of the layer of material 62 as a pupil of image bearing light 68a to 68n for viewing by the observer, or the image bearing light passes through the grating element 66 and is reflected by either a first internal surface 70 or second internal surface 72 of the layer of material 62 so as to propagate further along the layer of material 62 towards a distal end 74. Accordingly, the image bearing light internally reflected within the layer of material 62 will impinge on the grating element 66 further along the light pathway 64.

It will be noted that the individual pupils of image bearing light 68a to 68n that exit the layer material 62, as illustrated, are the centres of the output pupils and they are in this case regularly spaced. However, it is possible to devise a waveguide 60 such that the pupils of image bearing light 68a to 68n are irregularly spaced.

Figure 6:
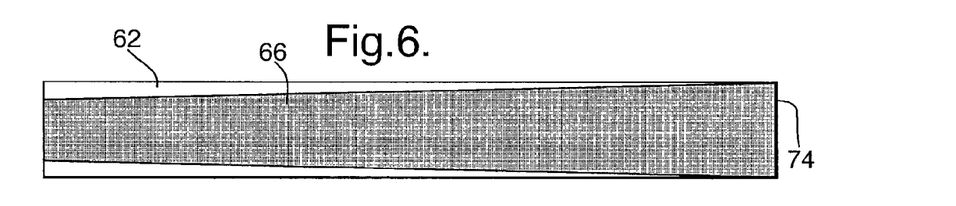
FIG. 6 illustrates, in plan view, a grating structure according to the present invention.

Referring to FIG. 6, wherein like references have been used to indicate similar integers to those described with reference to FIG. 5, the grating element 66 is arranged such that its width tapers from the distal end 74 to a source end where the image bearing light is injected into the layer of material 62. The grating element 66 does not extend across the entire area of the layer of material 62. As the intensity of image bearing light exiting the layer of material 62 as pupils of image bearing light 68a to 68n is proportional to the efficiency of the grating element 66 it encounters, in this case the area of the grating element 66 that the image bearing light is incident upon determines efficiency and that the area available for the grating element 66 increases with distance along the light pathway 64, the intensity of the pupils of image bearing light 68a to 68n can be balanced over the length of the layer of material 62.

In this manner, the efficiency of the grating element 66 is varied along the length of the layer of material 62 to achieve the desired pupils of image bearing light 68a to 68n along the length of the layer of material 62. This results in a more even brightness of pupils of image bearing light 68a to 68n, as perceived by the observer looking through the layer of material 62.

The intensity of the individual pupils of image bearing light 68a to 68n exiting the layer of material 62 is indicated by the thickness of the lines used to show pupils of image bearing light 68a to 68n in FIG. 5, which illustrates that the intensity remains substantially constant with distance along the light pathway 64. This gives a more even intensity of pupil of image bearing light 68a to 68n along the layer of material 62 such that the pupil of image bearing light 68n at distal end 74 exhibits a similar intensity as pupil of image bearing light 68a. Accordingly, the observer will perceive a more even intensity of light from the layer of material 62.

It will be understood that such a waveguide 60 could be used in a projection display such as that described with reference to FIGS. 1 and 2 to correct irregularity of the intensity of image bearing light from the transmission grating 24 of the first plate-like waveguide 14 and/or the exit grating 34 of the second plate-like waveguide 60.

The grating element 66 is arranged such that incident image bearing light that exits as the layer of material 62 is proportional to the efficiency of the grating element 66 that the image bearing light is incident upon and the efficiency varies with distance along the light pathway 64 of the layer of material 62 to provide a desired intensity from pupils of image bearing light 68a to 68n.

In this example efficiency of the grating element 66 is determined by the area of grating element 66 that image bearing light is incident upon.

Figure 7:
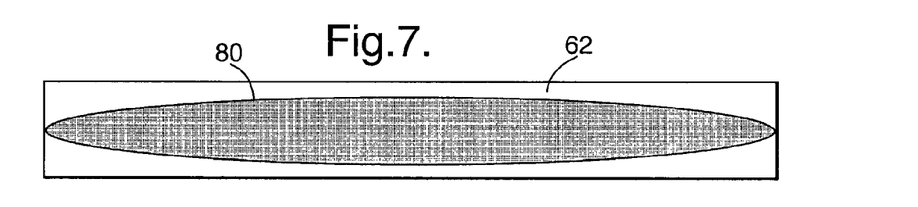
FIG. 7 illustrates, in plan view, an alternative grating structure according to the present invention.

With this in mind, referring to FIG. 7, an elliptical patterned grating element 80 can be used to vary the intensity of pupils of image bearing light such that intensity of pupils of image bearing light exiting the layer of material is greater at central pupils and intensity diminishes towards the ends of the layer of material 62.

It will be understood that a number of grating element patterns can provide the results of invention. FIGS. 8 to 13 provide some examples, wherein like references have been used to indicate similar integers to those described with reference to FIG. 5.

Figure 8:
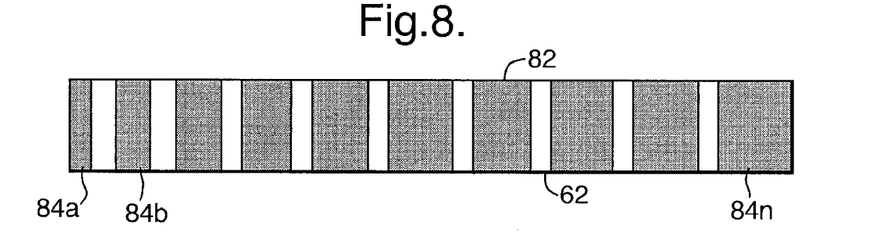
FIG. 8 illustrates, in plan view, an alternative grating structure according to the present invention.

Referring to FIG. 8, an alternative rectangular patterned grating element 82 includes grating areas 84a to 84n, which can be varied dimensionally along the length of the layer of material 62 to perform a similar function to that of the grating element 66 of FIG. 6.

Figure 9:
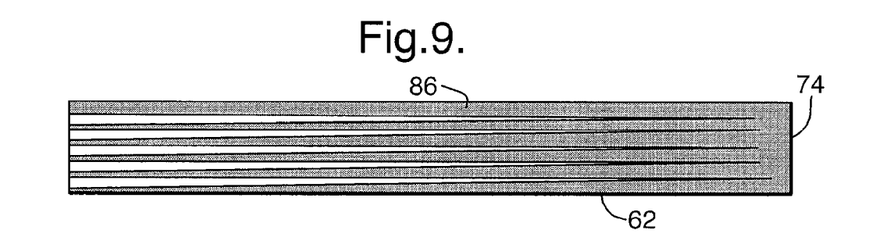
FIG. 9 illustrates, in plan view, an alternative grating structure according to the present invention.

Referring to FIG. 9, a multi-tapered patterned grating element 86 can be arranged such that there is a greater proportion of grating element 86 at the distal end 74 of the layer of material 62. In this case the grating element 86 is tapered in a single dimension. Again, the multi-tapered patterned grating element 86 will perform a similar function to that of grating element 66 of FIG. 6.

Figure 10:
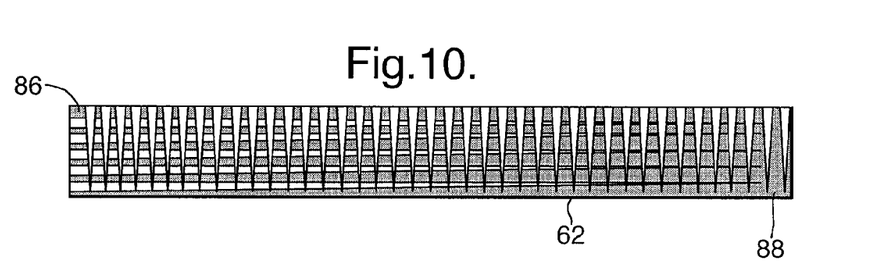
FIG. 10 illustrates, in plan view, an alternative grating structure according to the present invention.

Referring to FIG. 10, a patterned grating element includes the multi-tapered patterned grating element 86 of FIG. 9, which has been be overlaid with a further multi-tapered patterned grating element 88 to provide a multi-tapered patterned grating arrangement in two dimensions on the layer of material 62. This configuration will also provide a similar function to that of grating element 66 of FIG. 6.

Figure 11:
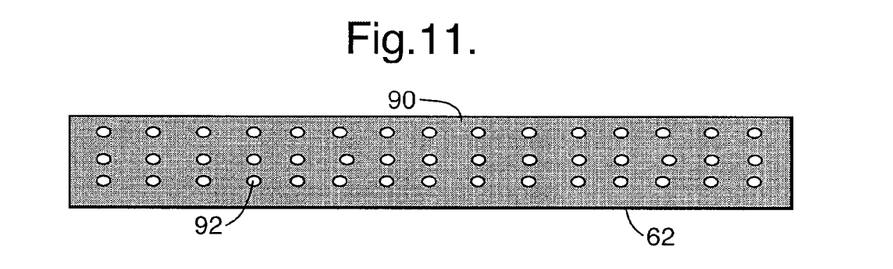
FIG. 11 illustrates, in plan view, an alternative grating structure according to the present invention.

Referring to FIG. 11, a rectangular grating element 90 includes circular non-grating sections 92 of regular size, but wherein the spacing between the circular non-grating sections 92 along the length of the layer of material 62 is irregular. Again, this configuration will also provide a similar function to that of grating element 66 of FIG. 6.

Figure 12:
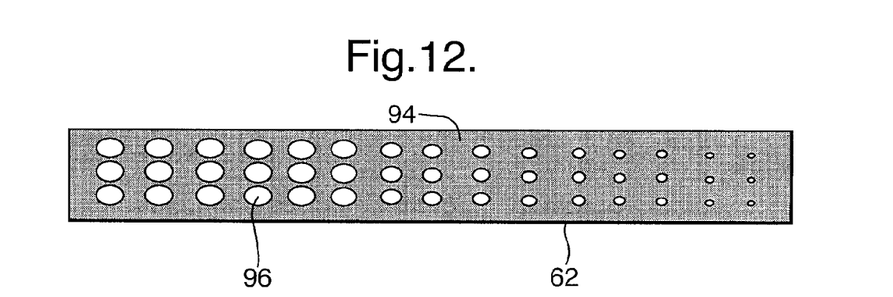
FIG. 12 illustrates, in plan view, an alternative grating structure according to the present invention.

Referring to FIG. 12, a rectangular grating element 94 includes circular non-grating sections 96, the centres of which are regularly spaced from one another, but the diameter of the circular non-grating sections 96 vary along the length of the layer of material 62 to provide the required pupils of image bearing light exiting the layer of material.

It will be appreciated that the circular non-grating sections 92, 96 of FIGS. 11 and 12 can be any other suitable shape, for example elliptical or square or rectangular.

Figure 13:
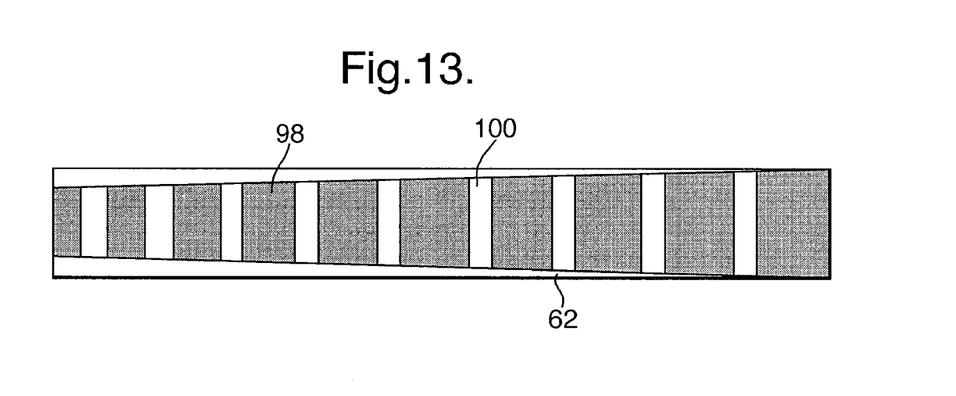
FIG. 13 illustrates, in plan view, an alternative grating structure according to the present invention.

Referring to FIG. 13, a tapered patterned grating element 98 includes non-grating sections 100, which are arranged at irregular spacings along the tapered patterned grating element 98 to provide a desired intensity of pupils of image light bearing exiting from the layer of material 62. This tapered patterned grating element 98 combines the features of FIGS. 6 and 8.

Figure 14:
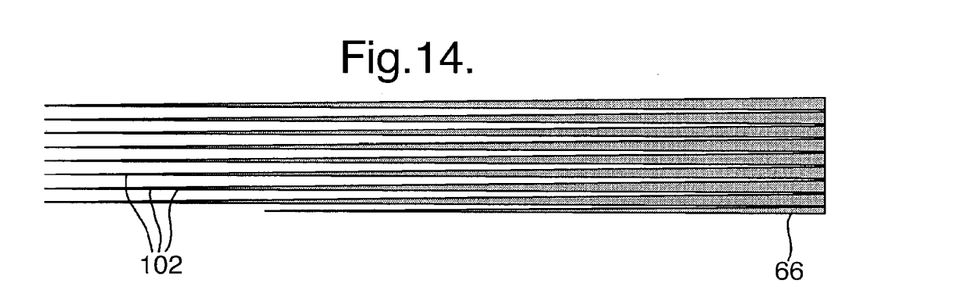
FIG. 14 illustrates, in plan view, a grating structure according to the present invention.
Figure 15:
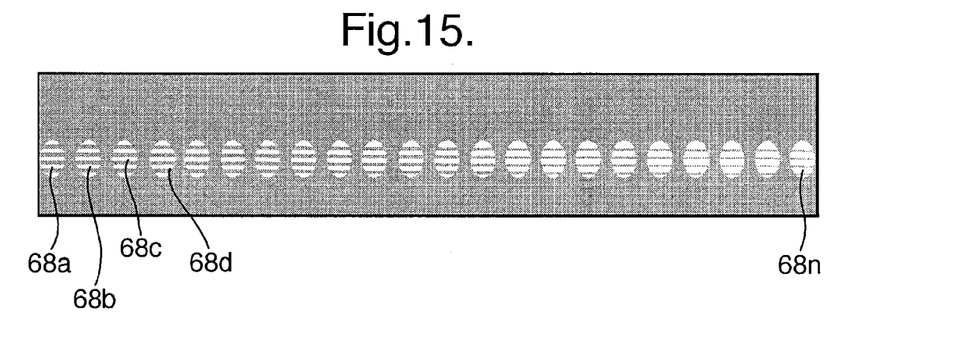
FIG. 15 illustrates, in plan view, a waveguide luminance response to the grating structure of FIG. 14.

Referring to FIG. 14, wherein like references have been used to indicate similar integers to those described with reference to FIG. 5, a grating element 66 having tapered non-grating sections 102, is used to provide substantially equal intensity pupils of image bearing light 68a to 68n, as illustrated in FIG. 15.

Additionally, the layer of material 62 can include a beam splitter arranged to divide impinging image bearing light as the image bearing light progresses along the light pathway 64. Such a beam splitter can be arranged at the point image bearing light is injected into the layer of material 62 or at points where there is no grating element present on the layer of material 62.

In any alternative embodiment, the variation in efficiency of the grating element 66 can be achieved by varying the thickness of a coating applied to the layer of material 62 or retained within the layer of material 62. In the former case, with surface relief technology, this can be achieved by varying the thickness of the coating applied to the profile of the grating element 62 at a structural level from about 20 nm to 70 nm. However, presently, this only allows a range of 5% to 15% efficiency whereas, the preferred embodiment described with reference to FIGS. 5 to 15 allows a range of 0% to 100% efficiency as it varies the area of the grating element 66 applied to the layer of material 62.

The invention claimed is:

1. A waveguide element, comprising:
    a layer of light transmissive material arranged to allow propagation of image bearing light along a predefined propagation axis of the layer of material by total internal reflection of the image bearing light within the layer of material; and
    a grating element carried on or within the layer of material that is arranged upon interaction with incident image bearing light to allow at least some incident image bearing light to exit the layer of material or to direct at least some of the incident image bearing light within the layer of material;
    wherein the area of the grating element that the image bearing light is incident upon increases with distance along the propagation axis of the layer of material such that the interaction of the image bearing light with the grating element increases with distance along the propagation axis.

2. A waveguide, as claimed in claim 1, wherein the area of the grating element is such that the luminance of image bearing light that exits the layer of material is substantially uniform with distance along the propagation axis of the layer of material.

3. A waveguide, as claimed in claim 1, wherein a beam splitter is also carried on or within the layer of material and the beam splitter is arranged to split incident image bearing light and to direct such image bearing light within the layer of material.

4. A Head Up Display, or Helmet Mounted Display, or Head Mounted Display comprising a waveguide as claimed in claim 1.

5. A waveguide, as claimed in claim 1, wherein the structure of the grating element is substantially constant while the area of the grating element that the image bearing light is incident upon increases.

6. A waveguide, as claimed in claim 1, wherein the efficiency of the grating element is controlled by the amount of area of the grating element that the image bearing light interacts with such that intensity of the image bearing light exiting the layer of material remains substantially constant with the distance along the propagation axis.

7. A projection display comprising a first waveguide element and a second waveguide element, wherein at least one of said waveguide elements is as claimed in any of the preceding claims, the projection display being arranged for displaying an image to an observer, and comprising:
    an image-providing light source device arranged to generate an image and to inject image bearing light into the first waveguide element to follow a propagation axis;
    wherein the first waveguide element has a first grating element which is arranged to direct the image bearing light internally along the propagation axis and through which the image bearing light is, outputted from the first waveguide element;
    the second waveguide element includes a coupling grating arranged to receive the image bearing light from the first waveguide element and to direct the image bearing light along the second waveguide element to follow a propagation axis;
    the second waveguide element further includes an exit grating arranged to diffract received image bearing light out of the second waveguide element towards an observer;

wherein the first and/or the exit grating is arranged upon interaction with incident image bearing light to allow at least some incident image bearing light to exit its associated waveguide element or to direct at least some of the incident image bearing light within its associated waveguide element; and wherein the area of the first and/or the exit grating that the image bearing light is incident upon increases with distance along as saidthe propagation axis of the layer of material such that the interaction of the image bearing light associated with the grating element increases with distance along the propagation axis.

8. A projection display, as, claimed in claim 7, wherein the first and/or exit grating is arranged such that the luminance of image bearing light that exits its associated waveguide is substantially uniform with distance along the propagation axis of its associated waveguide.

9. A projection display, as claimed in claim 7, wherein the first grating is arranged such that incident inputted image bearing light is diffracted therefrom with the incidence angle of the diffracted light at internal surfaces of the first waveguide element arranged to be greater that the critical angle for the material from which the first waveguide element is made.

10. A projection display, as claimed in claim 7, wherein the coupling grating is arranged such that incident image bearing light is diffracted therefrom with the incident angle of the diffracted light at internal surfaces of the second waveguide element arranged to be greater than the critical angle for the material from which the second waveguide element is made.

11. A projection display, as claimed in claim 7, wherein the diffractive power of the coupling grating is rotated through 90° with respect to the diffractive power of the first grating.

12. A projection display, as claimed in claim 7, wherein the second waveguide element includes a narrow band selective reflection coating provided on a surface of the second waveguide element parallely spaced from the exit grating, which reflective coating is arranged to reflect light passing through the exit grating back towards the narrow band selective reflection coating to the exit grating.

13. A projection display, as claimed in claim 7, wherein the first waveguide element and/or the second waveguide element is curved.

14. A projection display, as claimed in claim 7, wherein the first waveguide element is plate-shaped, the second waveguide element is plate-shaped and the first and second waveguide elements are arranged substantially parallel to one another.

15. A projection display, as claimed in claim 7, wherein the first grating, coupling grating and exit grating are arranged substantially in the same plane.

16. A projection display, as claimed in claim 15, wherein the first waveguide and the second waveguide are formed within a single piece of material.

17. A projection display, as claimed in claim 7, wherein the first waveguide element is rod-shaped, the second waveguide element is plate-shaped and the first and second waveguide elements are arranged such the image bearing light exits the first waveguide element along a longitudinal axis of the first waveguide element and enters the second waveguide element to propagate along the propagation axis of the second waveguide element.

18. A Head Up Display, or Helmet Mounted Display, or Head Mounted Display comprising a projection display as claimed in any claim 7.

* * * * *

UNITED STATES PATENT AND TRADEMARK OFFICE
CERTIFICATE OF CORRECTION

| | | Page 1 of 1 |
|---|---|---|
| PATENT NO. | : 8,493,662 B2 | |
| APPLICATION NO. | : 13/119390 | |
| DATED | : July 23, 2013 | |
| INVENTOR(S) | : Noui | |

It is certified that error appears in the above-identified patent and that said Letters Patent is hereby corrected as shown below:

On title page, Item (86) 371 (c)(1), (2), (4) Date:
replace "Mar. 16, 2001"
with --Mar. 16, 2011--.

In the Claims
In column 8, lines 48-49 (claim 7), replace "the preceding claims" with --claims 1-3--.

Signed and Sealed this
Eleventh Day of February, 2014

Michelle K. Lee
*Deputy Director of the United States Patent and Trademark Office*